(12) United States Patent
Nakamura et al.

(10) Patent No.: US 7,025,412 B2
(45) Date of Patent: Apr. 11, 2006

(54) VEHICLE BODY STRUCTURE

(75) Inventors: Tadashi Nakamura, Wako (JP);
Yoshiyuki Toba, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/923,480

(22) Filed: Aug. 19, 2004

(65) Prior Publication Data
US 2005/0046236 A1   Mar. 3, 2005

(30) Foreign Application Priority Data
Aug. 26, 2003   (JP) .............................. 2003-302141

(51) Int. Cl.
*B62D 25/20* (2006.01)
(52) U.S. Cl. .................. 296/193.07; 296/204
(58) Field of Classification Search .......... 296/193.07, 296/204
See application file for complete search history.

(56) References Cited

U.S. PATENT DOCUMENTS

| | | | | |
|---|---|---|---|---|
| 1,624,903 A | * | 4/1927 | Wetzel | 296/204 |
| 2,126,607 A | * | 8/1938 | Boehner | 280/797 |
| 2,856,226 A | * | 10/1958 | Purdy | 296/204 |
| 4,129,330 A | * | 12/1978 | Schwuchow | 296/204 |
| 4,557,519 A | * | 12/1985 | Matsuura | 296/204 |
| 4,824,166 A | * | 4/1989 | Denker et al. | 296/204 |
| 5,352,011 A | * | 10/1994 | Kihara et al. | 296/203.03 |

FOREIGN PATENT DOCUMENTS

| | | | |
|---|---|---|---|
| DE | 4330559 | * | 3/1995 |
| JP | 05-221342 | | 8/1993 |

* cited by examiner

*Primary Examiner*—Dennis H. Pedder
(74) *Attorney, Agent, or Firm*—Rankin, Hill, Porter & Clark LLP

(57) ABSTRACT

A vehicle body structure with a floor panel having rigidity to withstand an impact energy at an offset collision of the vehicle is provided. The floor panel has a plurality of beads formed in a direction in which an impact energy acts. The beads are formed in the floor panel such that they extend obliquely rearward from left and right floor frame members toward the transversal center and are aligned longitudinally of the vehicle body.

4 Claims, 12 Drawing Sheets

(COMP. EX.)

(COMP. EX.)

(EMBODIMENT)

VEHICLE BODY STRUCTURE

FIELD OF THE INVENTION

The present invention relates generally to a vehicle body structure and, more particularly, to an improvement in a floor panel portion thereof.

BACKGROUND OF THE INVENTION

A body structure for vehicles such as automobiles, designed to increase the rigidity of a floor panel portion is disclosed, for example, in Japanese Patent Laid-Open Publication No. 5-221342. The disclosed vehicle body structure will be described with reference to FIGS. 12 and 13 hereof.

Referring to FIGS. 12 and 13, a vehicle 200 has a body 201 with a floor panel 204. The floor panel 204 has a floor tunnel 202 bulged toward a passenger compartment at a transversal center and extending longitudinally of the body. To the underside of the floor panel 204, a pair of left and right floor frame members 203, 203 extending longitudinally on the opposite sides of the floor tunnel 202 are joined. In the floor panel 204, a number of beads 205 extending transversely are formed at longitudinal regular intervals. The beads 205 intersect the left and right floor frame members 203, 203.

As shown in FIG. 13, when an impact energy En acts from the front on a front portion of the floor panel 204 at a transversely outer position, that is, at an offset impact on the front of the body 201, the impact energy En acts on the front end of one of the floor frame members 203. The impact energy En is dispersed and transmitted from the floor frame member 203 into the corresponding one of the left and right sides of the floor panel 204, and also transmitted to the floor tunnel 202.

At an offset collision, an impact energy En is greater on one of the right and left sides. As compared with that at a frontal crash, an impact energy En acting on one of the floor frame members 203 is much greater. The impact energy En transmitted from the floor frame member 203 to the floor panel 204 is also greater. When the great impact energy En causes the floor frame member 203 to retreat, the floor panel 204 deforms rearward from the floor tunnel 202 of relatively high rigidity.

Against this, the portion of the floor panel 204 in which the beads 205 intersect the floor frame member 203 has great rigidity, but the other portion has small rigidity. The floor panel 204 largely deforms in the low-rigidity portion (, forming large creases, for example), affecting the amount of retreat of the floor frame member 203 joined to the floor panel 204, and affecting the state of the joint between the floor panel 204 and the floor frame member 203. In order to limit these effects, it may be conceivable to reinforce the low-rigidity portion with a reinforcing material. This, however, would make the body structure complicated, increasing the weight of the body, and leaving room for improvement.

The present invention provides a vehicle body structure with a simple configuration capable of increasing the rigidity of a floor panel against an impact energy at an offset collision.

SUMMARY OF THE INVENTION

According to the present invention, there is provided a vehicle body structure which comprises: a floor panel having a floor tunnel formed at a transversal center and extending longitudinally of a vehicle body; left and right floor frame members provided on opposite sides of the floor tunnel in spaced relation to each other and extending longitudinally of the vehicle body; and left and right front side frame members extending forwardly of the vehicle body from front ends of the left and right floor frame members, respectively, the floor panel being placed on and joined to the left and right floor frame members and having a plurality of beads extending, in top plan view, obliquely rearward from at least one side of the left and right floor frame members toward the transversal center and aligned longitudinally of the vehicle body.

In the body structure of this invention, when an impact energy at an offset collision of the vehicle acts on either one of the left and right floor frame members, the floor panel receives an obliquely rearward compressive load from the floor frame member toward the transversal center. The elongate beads are thus provided approximately in the direction of the load. The obliquely rearward inclination angle is preferably 40° to 50° in an embodiment.

As a result, the beads increase the rigidity of the floor panel in the direction of a compressive load. In this manner, the rigidity of the floor panel against an impact energy at an offset collision is increased. The increased rigidity of the floor panel prevents production of creases in the floor panel. This limits the retreat of the floor frame member due to an impact energy, preventing deformation. The amount of retreat of the floor frame member joined to the floor panel is thus limited, maintaining the state of the joint between the floor panel and the floor frame member.

The structure of only forming the beads in the floor panel, increasing the rigidity of the floor panel simplifies the structure of the vehicle body, preventing an increased weight of the body.

The formation of the beads increases the rigidity of the floor panel, improving the damping performance of the floor panel when the vehicle is running.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
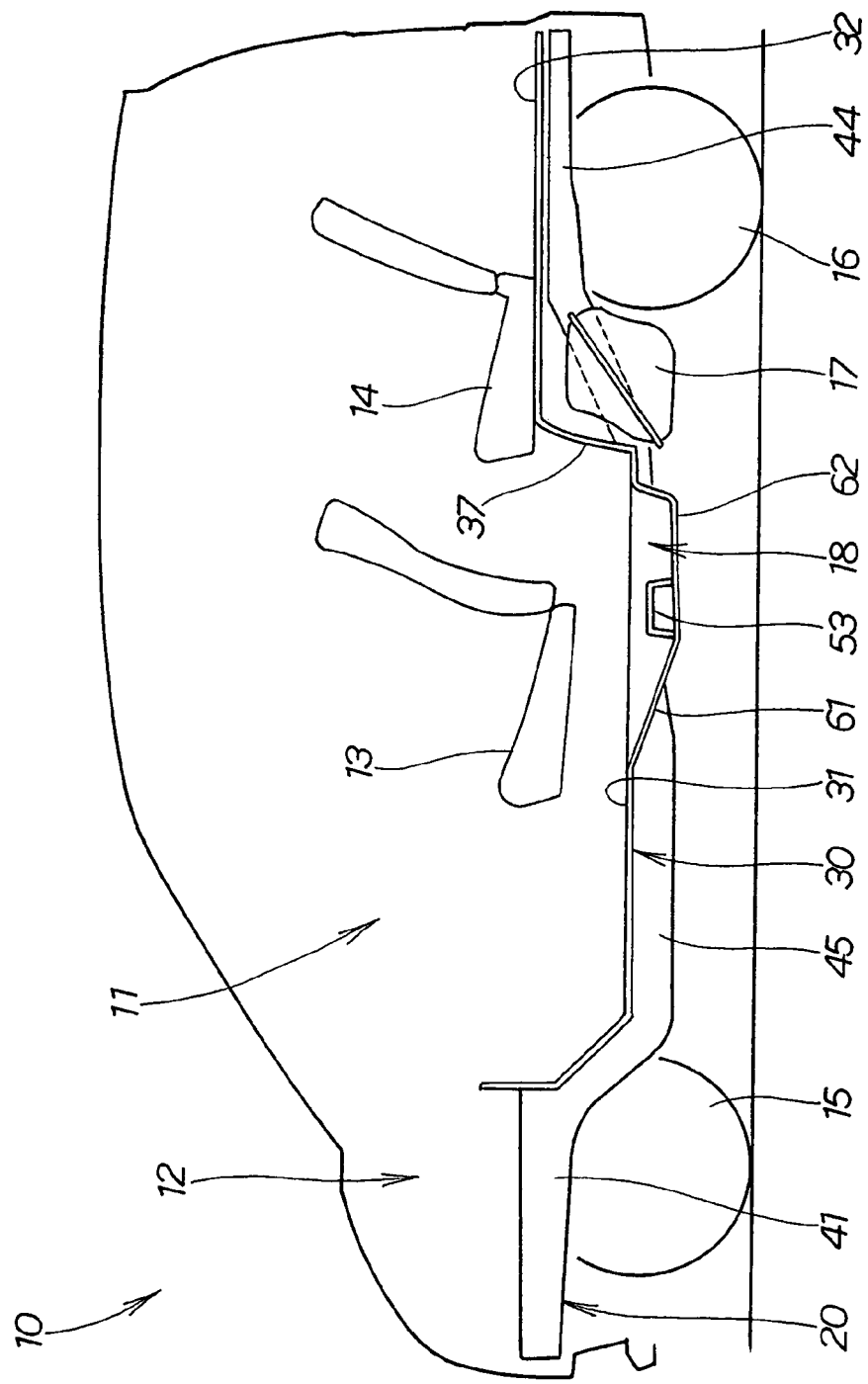
FIG. 1 is a schematic cross-sectional side view of a vehicle having a body structure according to the present invention.

A vehicle 10 shown in FIG. 1 is a station wagon with a tail gate, having a passenger compartment 11 and an engine compartment 12 with no partition between the passenger compartment 11 and a rear trunk. The vehicle 10 has passenger seats (i.e., front seats 13 and rear seats 14) disposed in front and behind in the passenger compartment 11, and has a floor panel 30 extended over frame members of the body 20, a rear portion of which panel 30 forming a trunk portion.

Reference numeral 15 denotes a front wheel, and 16 a rear wheel.

The floor panel 30 includes a front floor panel 31 located at the front of the floor panel 30, and a rear floor panel 32 continued from the rear edge of the front floor panel 31, having a higher horizontal position than that of the front floor panel 31.

The left and right two front seats 13 are disposed at approximately the center of the front floor panel 31. The left and right two rear seats 14 are disposed at the front of the rear floor panel 32. A fuel tank 17 is disposed below the rear floor panel 32, beneath the rear seats 14.

Figure 2:
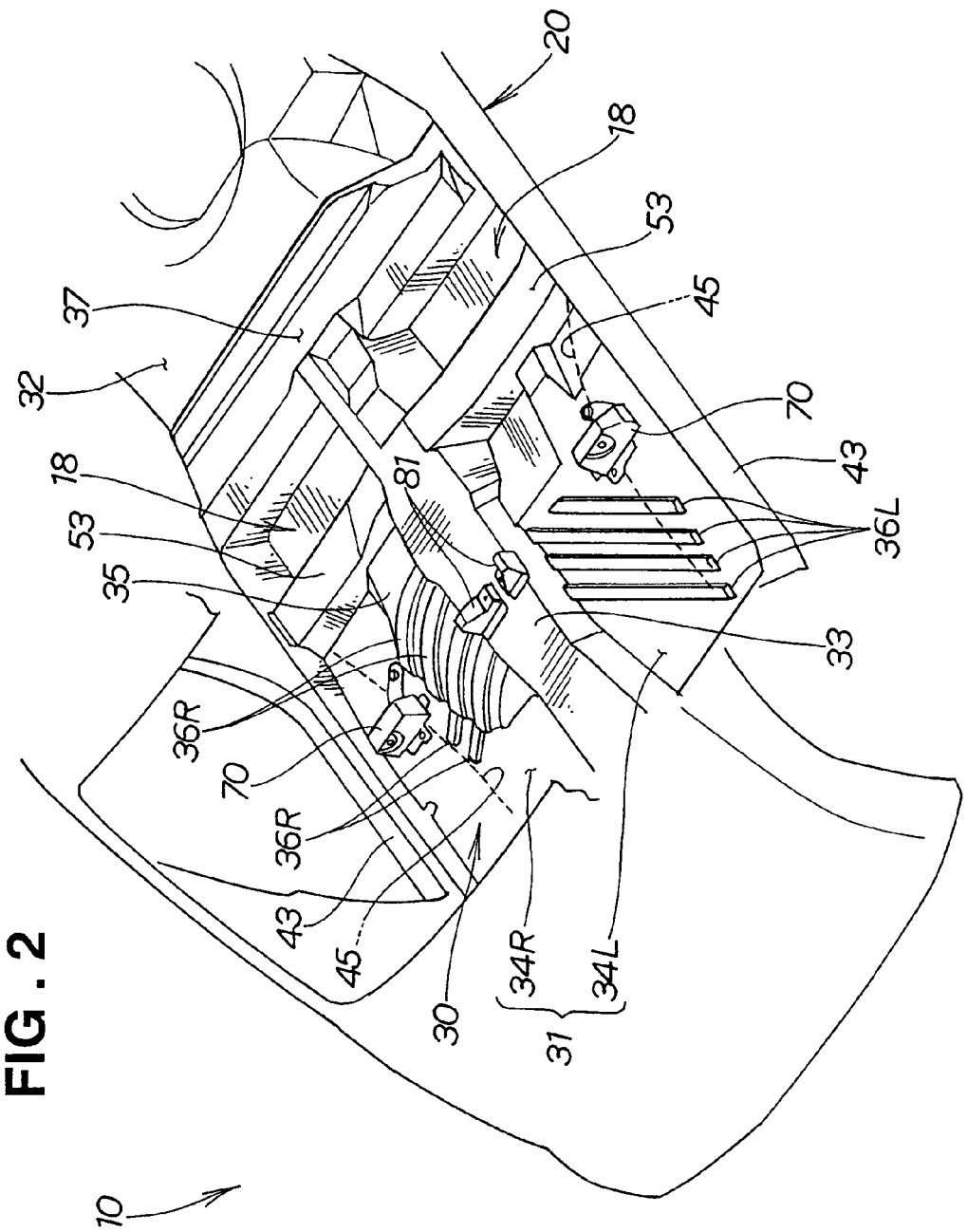
FIG. 2 is a perspective view of the body with a floor panel formed with a plurality of beads according to the present invention.

As shown in FIGS. 1 and 2, the front floor panel 31 has left and right underfloor storage compartments 18, 18 formed between the front seats 13 and the rear seats 14, that is, under the feet of passengers seated on the rear seats 14.

As shown in FIG. 2, the front floor panel 31 has, relative to a floor tunnel 33 located at the transversal center, an almost flat left floor half 34L of the left half, and a right floor half 34R having a bulging portion 35 as a portion of the right half bulging upward. The left floor half 34L and the right floor half 34R each have a number of beads 36L, 36R for increasing the floor rigidity.

Figure 3:
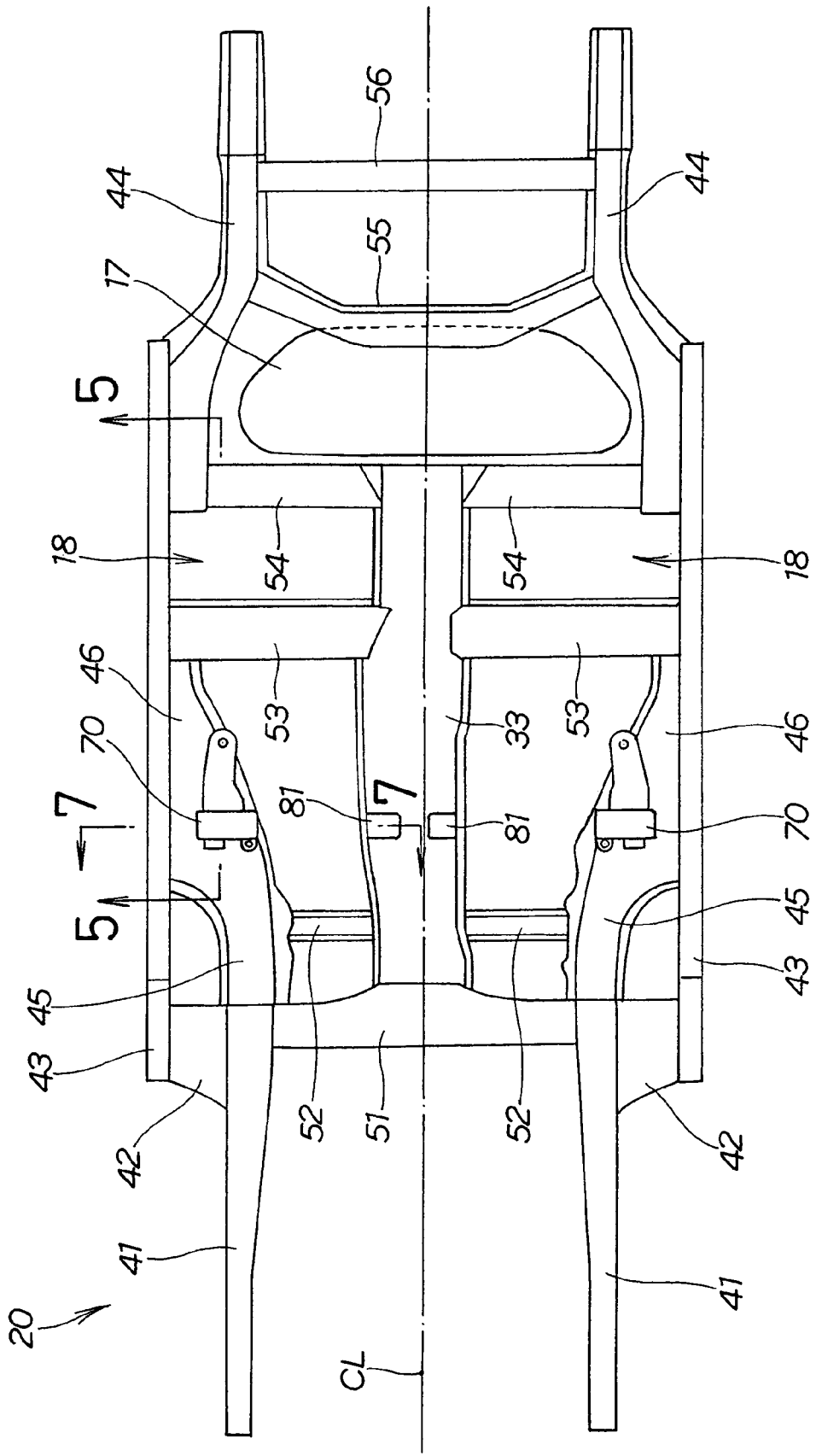
FIG. 3 is a plan view of the body with the floor panel removed.

FIG. 3 is a plan view of the body with the floor panel 30 removed, but, for convenience of explanation, the floor tunnel 33 of the floor panel 30 is exceptionally shown.

The body 20 has, at the front, left and right front side frame members 41, 41 extending longitudinally of the vehicle body, left and right side outriggers 42, 42 joined to the rear of the front side frame members 41, 41, left and right side sills 43, 43 extending rearward from the rear of the side outriggers 42, 42, and left and right rear side frame members 44, 44 extending rearward from the rear of the side sills 43, 43, as its main components.

The floor tunnel 33 extends longitudinally of the vehicle body at the transversal center CL. A pair of left and right floor frame members 45, 45 extend longitudinally of the vehicle body along the opposite sides of the floor tunnel 33. The floor frame members 45, 45 are joined at their rear end portions 46, 46 to longitudinally middle portions of the left and right side sills 43, 43.

Thus, the floor frame members 45, 45 and the side sills 43, 43 are provided in this order from the transversal center CL side to the left and right sides. As described above, the rear end portions 46, 46 of the left and right floor frame members 45, 45 are directly joined to the longitudinally middle portions of the side sills 43, 43.

In other words, the left and right front side frame members 41, 41 are members extending forward from the front ends of the left and right floor frame members 45, 45.

A first crossmember 51 is extended between the rear ends of the left and right front side frame members 41, 41. A pair of left and right second cross-members 52, 52 are extended between front portions of the floor tunnel 33 and front portions of the left and right floor frame members 45, 45. Left and right third crossmembers 53, 53 are extended, at the rear end positions of the left and right floor frame members 45, 45, between the floor tunnel 33 and the left and right side sills 43, 43. Left and right fourth crossmembers 54, 54 are extended between the floor tunnel 33 and rear portions of the left and right side sills 43, 43. Fifth and sixth crossmembers 55, 56 are extended between the left and right rear side frame members 44, 44 in front and rear positions.

The floor tunnel 33 extends from the first crossmember 51 to the fourth crossmembers 54.

Now, the relationship between the side sills and the floor frame members will be described with reference to FIGS. 4 to 7.

Figure 4:
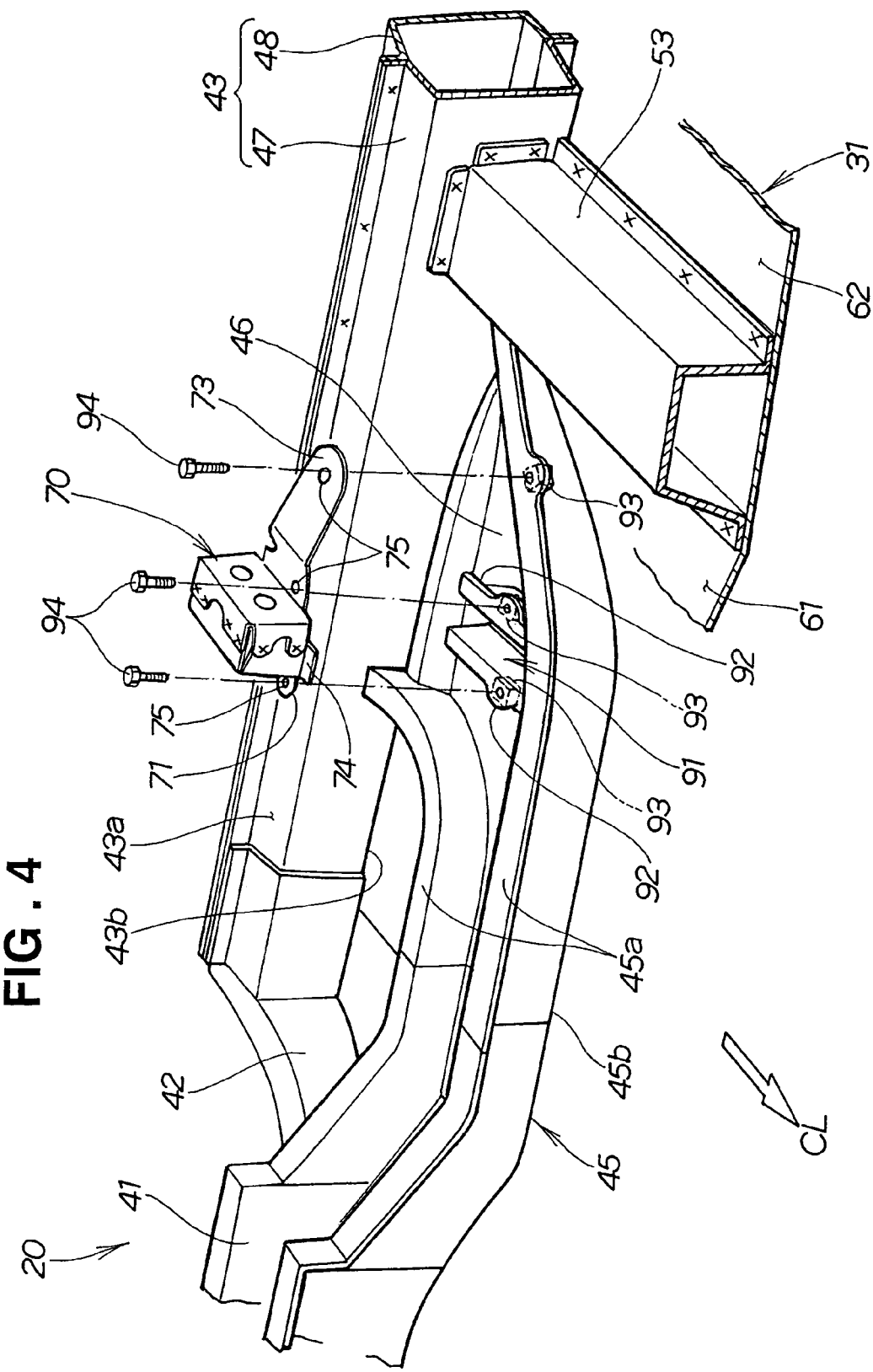
FIG. 4 is a perspective view of the body, illustrating the relationship between a right side sill and a right floor frame member shown in FIG. 3.

As shown in FIG. 4, each side sill 43 is a closed-section beam with a transversely inward side sill inner 47 and a transversely outward side sill outer 48 combined together. When the side sill 43 is viewed from the side, the side sill 43 is a member having a thin front portion joined to the side outrigger 42 and a thick portion rearward of the third crossmember 53.

Figure 5:
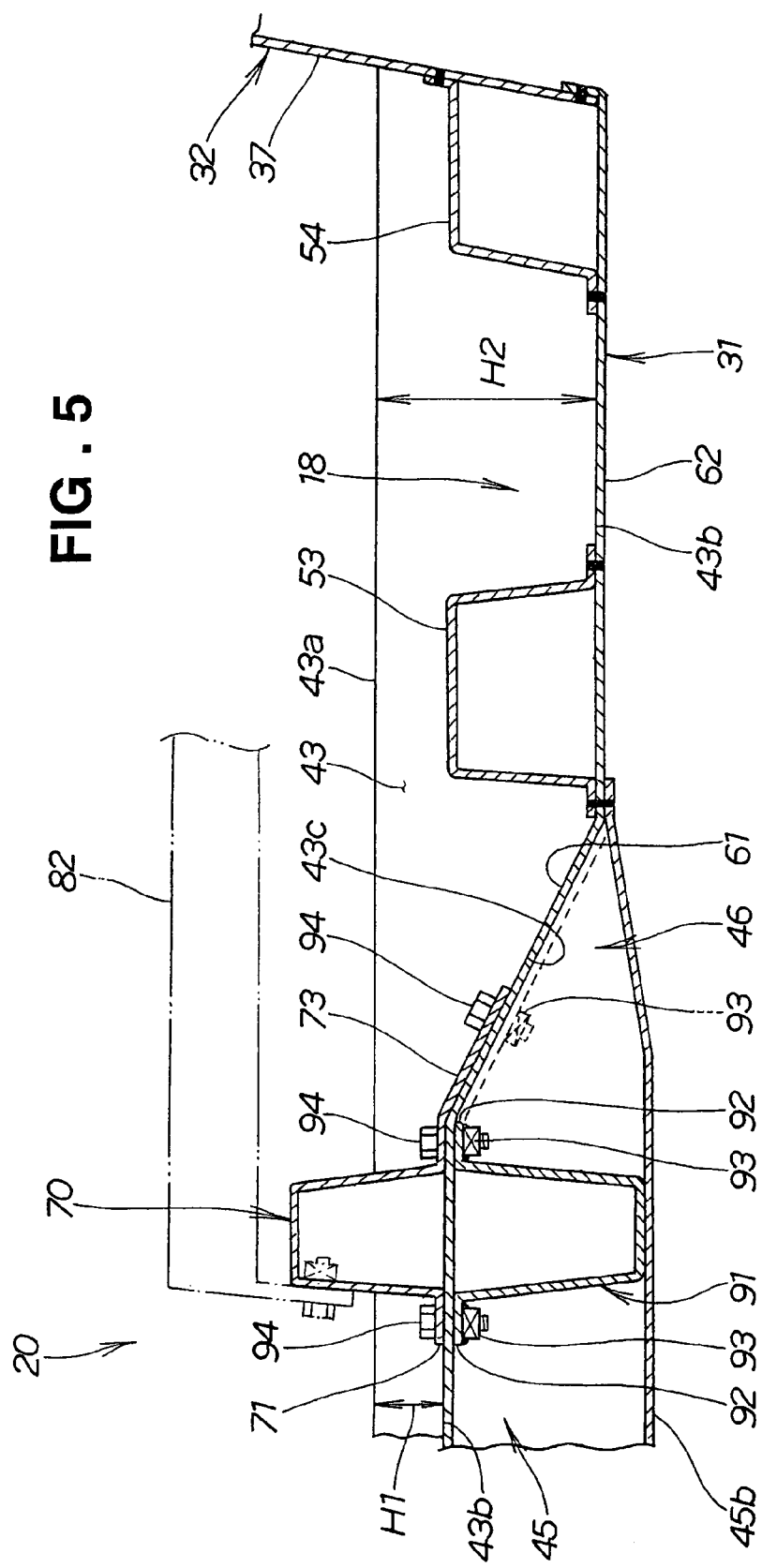
FIG. 5 is a cross-sectional view along line 5—5 in FIG. 3.

More specifically, as shown in FIGS. 4 and 5, the side sill 43 has an almost flat top surface 43a, a front thickness (the section height from the top surface 43a to a bottom surface 43b) of H1, an inclined surface 43c of a rearward and downward inclination of the bottom surface 43b proximate to the third crossmember 53, and a thickness of H2 at a portion rearward of the third crossmember 53. The rear thickness H2 is greater than the front thickness H1.

Figure 6:
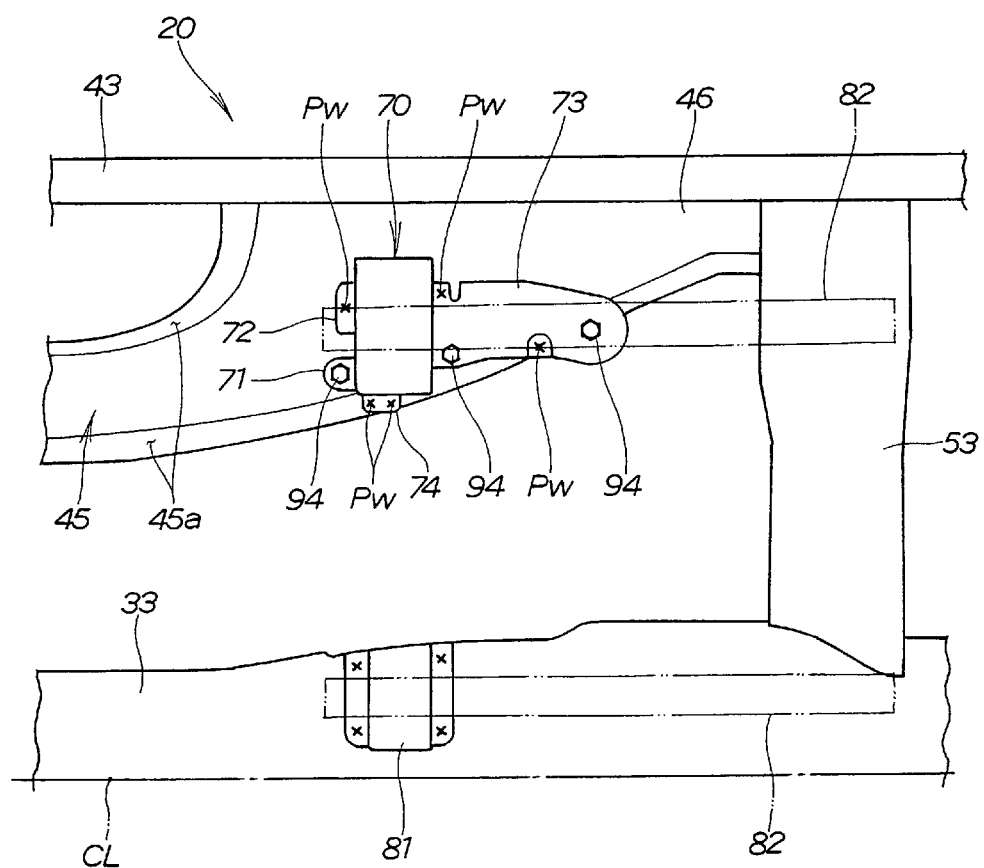
FIG. 6 is a top plan view of the body, illustrating the relationship between the right side sill, the right floor frame member and seat brackets.

As shown in FIGS. 4 and 6, each floor frame member 45 has a substantially U-shaped cross-section opening upward, having flanges 45a, 45a extending from the upper edges to the left and right. The rear end portion 46 of the floor frame member 45 has, when viewed from the top, a widened shape widening in a curve toward the side sill 43.

Figure 7:
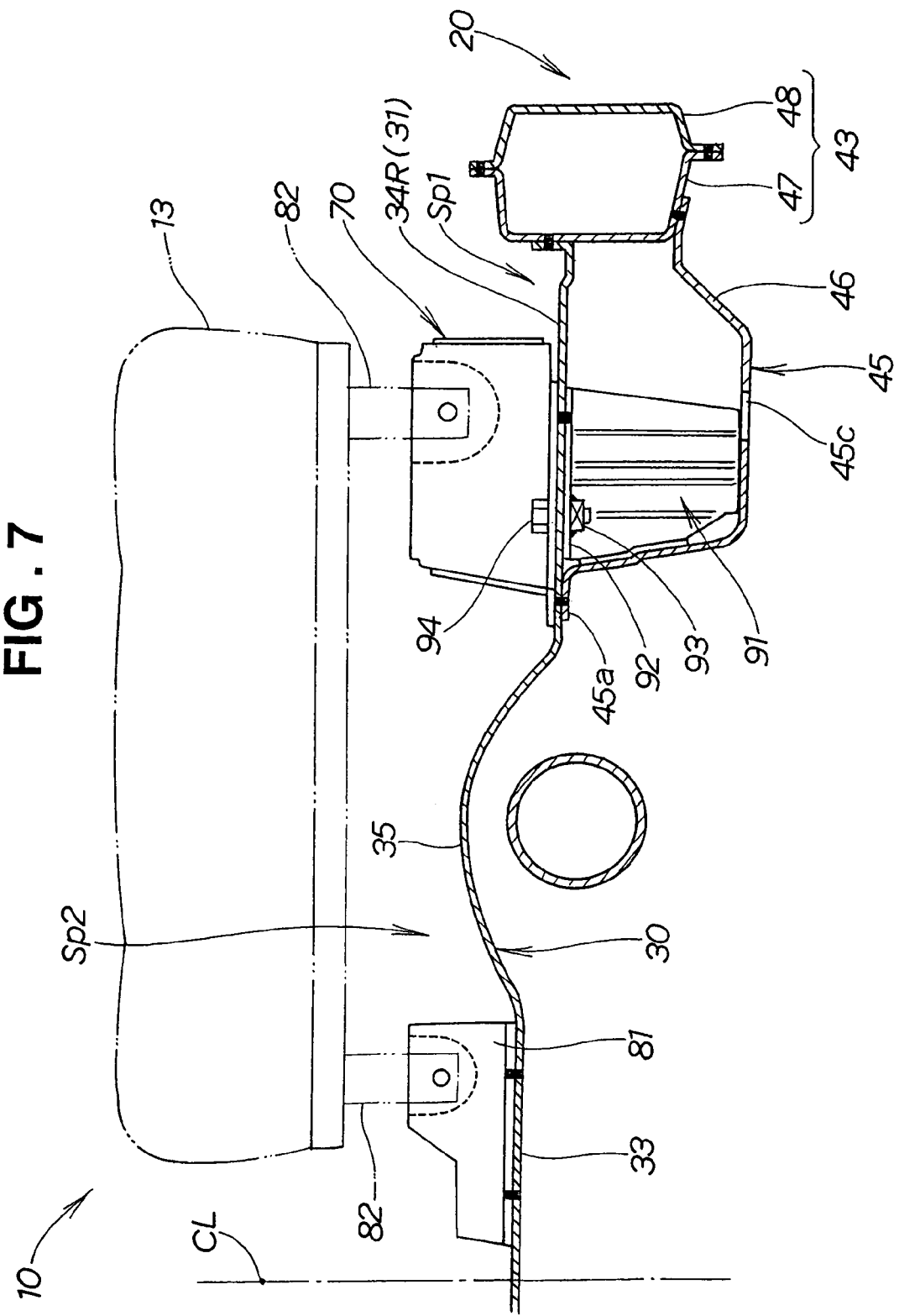
FIG. 7 is a cross-sectional view along line 7—7 in FIG. 3.

As shown in FIG. 5, the rear end portion 46 extends rearward along the bottom surface 43b of the side sill 43 and also extends rearward in a taper along the inclined surface 43c of the side sill 43. FIG. 5 illustrates that the end of the rear end portion 46 is joined to the bottom of the third crossmember 53 by spot welding. FIG. 7 illustrates that the end of the rear end portion 46 is joined to the bottom of the side sill 43 by spot welding.

Thus, as shown in FIG. 6, when the body 20 is viewed from the top, the rear end portion 46 of the floor frame member 45 has a widened shape widening in a curve toward the side sill 43, the end of which is joined to a longitudinally middle portion of the side sill 43. The rear end portion 46 is also joined to the third crossmember 53.

That is, as shown in FIG. 3, the left and right floor frame members 45, 45 are set shorter than the left and right side sills 43, 43, and the rear end portions 46, 46 of the left and right floor frame members 45, 45 are directly joined to the longitudinally middle portions of the left and right side sills 43, 43 and also indirectly joined to the longitudinally middle portions of the left and right side sills 43, 43 via the left and right third crossmembers 53, 53.

As a result, the body 20 has sufficient strength and rigidity without extending the floor frame members 45 to the rear of the body 20.

When an impact energy acts from the front on either one of the front side frame members 41, the impact energy is transmitted from the front side frame member 41 to the corresponding floor flame member 45. The impact energy transmitted to the floor flame member 45 can be efficiently dispersed from the rear end portion 46 into the side sill 43 and the third crossmember 53.

As shown in FIG. 5, the front floor panel 31 is a plate material placed and extended, in front of the third crossmembers 53, over the body 20, that is, over the floor frame members 45, and is also placed and extended, behind the third crossmembers 53, over the bottom of the body 20, that is, on the third and fourth crossmembers 53, 54.

The rear floor panel 32 is a plate material having a bent-down portion 37 at its front edge extended downward and joined to the rear of the front floor panel 31.

More specifically, the front floor panel 31 is also extended over the floor frame members 45, and extends rearward and downward in an inclination nearly along the top surfaces inclined rearward downward at the rear end portions 46, and further extends rearward nearly horizontally along the bottom of the third crossmembers 53.

Hereinafter, a portion inclined rearward downward as described above of the front floor panel 31 is referred to as a "front wall 61 of the underfloor storage compartments" and a portion of the front floor panel 31 extending horizontally rearward along the bottom of the third crossmembers 53 is referred to as a "bottom plate 62 of the underfloor storage compartments."

The left and right underfloor storage compartments 18, 18 are, as shown in FIGS. 2, 3 and 5, provided rearward of the rear end portions 46 of the floor frame members 45, extending from the transversal center CL to at least the left and right side sills 43, 43. The underfloor storage compartments 18, 18 are upward-opening depressions in a substantially rectangular shape in a plan view, enclosed by the left and right side sills 43, 43, the central floor tunnel 33, the third crossmembers 53, the front floor panel 31, and the bent-down portion 37 of the rear floor panel 32. The underfloor storage compartments 18, 18 are located on the opposite sides of the floor tunnel 33.

As described above, each underfloor storage compartment 18 has the front wall 61 inclined rearward downward from the front and the nearly horizontal bottom plate 62 extending rearward from the lower edge of the front wall 61. The height of the bottom plate 62 (bottom 62) of the underfloor storage compartment 18, that is, the rear portion of the front floor panel 31 is slightly greater than that of the bottom surface 45b of the floor frame member 45 (see FIG. 5).

The fourth crossmembers 54 may be eliminated. The fourth crossmembers 54 may have a combined structure of the front floor panel 31 and the rear floor panel 32 joined to the rear of the front floor panel 31.

As shown in FIG. 3, an outer seat bracket 70 is provided on at least one of the rear end portions 46, 46 of the left and right floor frame members 45, 45. An inner seat bracket 81 is provided on the floor tunnel 33.

These seat brackets 70, 81 are mounting members for mounting the front seat 13 (passenger seat 13) shown in imaginary lines in FIG. 7. The front seat 13 is longitudinally slidably mounted on the seat brackets 70, 81 via seat rails 82, 82.

Now, the structure of mounting the outer seat bracket 70 on the floor frame member 45 will be described with reference to FIGS. 4 to 7.

The outer seat bracket 70 is a transversely elongated substantially rectangular-shaped box opening downward, integrally having at its lower edges a plurality of joint flanges each extending sideways (two front flanges 71, 72, a rear flange 73, and a transversely inward side flange 74). The front flange 71 located transversely inward has a bolt hole 75. The rear flange 73 has front and rear two bolt holes 75, 75.

As shown in FIG. 5, a stay 91 is provided in the rear end portion 46 of the floor frame member 45 at the position corresponding to that of the seat bracket 70. The stay 91 is a substantially U-shaped member opening upward in a cross-sectional view, having flanges 92, 92 extending forward and rearward from the upper edges. The flanges 92, 92 have flange faces at the same height as that of the flange faces of the flanges 45a, 45a of the floor frame member 45. The flanges 92, 92 of the stay 91 and the flange 45a of the floor frame member 45 have nuts 93 fixed by welding or the like to the back side at positions corresponding to those of the bolt holes 75 of the seat bracket 70.

The seat bracket 70 is placed on the floor frame member 45 and the stay 91 with the front floor panel 31 interposed therebetween. Specifically, the flanges 71 to 74 of the seat bracket 70 are placed on the flange 45a of the floor frame member 45 and the flanges 92, 92 of the stay 91 from above the front floor panel 31, the flanges and the front floor panel 31 are spot-welded together at five weld points Pw (see FIG. 6), and three bolts (i.e., fastening members) are fastened from above into the respective nuts 93 through the bolt boles 75, thereby fastening the seat bracket 70 to the floor frame member 45.

In this manner, the floor panel 30 and the seat bracket 70 are placed on the floor frame member 45 in this order, and the floor frame member 45, floor panel 30 and seat bracket 70 in this state are joined together by spot-welding the points Pw and also joined together by fastening them together with the bolts 94.

Thus, as shown in FIG. 5, the floor frame member 45 and the seat bracket 70 form a closed cross-section structure, resulting in increased strength and rigidity of the floor frame member 45 and the seat bracket 70.

For the joint structure between the floor frame member 45, floor panel 30 and seat bracket 70, the joint structure by spot welding and the joint structure by fastening them together with fastening members of the bolts 94 are used in combination, being able to complement each other's joint structure.

When the floor frame member 45, floor panel 30 and seat bracket 70 are simply spot-welded, for example, it can be necessary to provide a number of jig insertion holes 45c (see FIG. 7) for inserting a welding jig into the floor frame member 45. When the number of the jig insertion holes 45c is increased, it is necessary to increase or reinforce the frame plate thickness to ensure the strength and rigidity of the floor frame member 45, expediently increasing the weight of the vehicle.

By contrast, when the joint structure by fastening with the bolts 94 is used, the nuts 93 can be previously fixed to the back side of the floor frame member 45. Using the fixed nuts 93, the bolts 94 can be fastened from one side to easily join the floor frame member 45, floor panel 30 and seat bracket 70 together. As a result, the number of the jig insertion holes 45c for the joining operation can be reduced. This eliminates the need for increasing or reinforcing the frame plate thickness in order to ensure the strength and rigidity of the floor frame members 45.

As shown in FIG. 7, the rear end portion 46 of the floor frame member 45 is directly and/or indirectly joined to the longitudinal middle portion of the side sill 43, and the outer seat bracket 70 is provided on the rear end portion 46, which eliminates the need for extending the seat bracket 70 between the left and right side sills 43.

Therefore, the seat bracket 70 can be reduced to a size attachable to the passenger seat 13 of the front seat. The seat bracket 70 can thus be reduced in size and weight, resulting in reduced costs of the body 20.

The seat bracket 70 is provided on the rear end portion 46 of the floor frame member 45 joined to the side sill 43, so that the transverse position of the seat bracket 70 can be set freely within the width (within the transverse dimension) of the rear end portion 46 as shown in FIG. 7. Thus, the position of the seat bracket 70 can be easily set to fit the passenger seat 13, increasing the design freedom of the body 20.

Since the seat bracket 70 can be disposed in a position apart from the side sill 43, a space Sp1 is formed between the side sill 43 and the seat bracket 70. The outer seat bracket 70 and the inner seat bracket 81 can be composed of different members. Thus, above the floor panel 30, a space Sp2 is formed between the outer and inner seat brackets 70, 81.

These spaces Sp1, Sp2 can be effectively utilized. For example, they can be utilized as storage spaces, or utilized as spaces in which small accessories (a compact disc changer, a navigator unit) are disposed.

Figure 8:
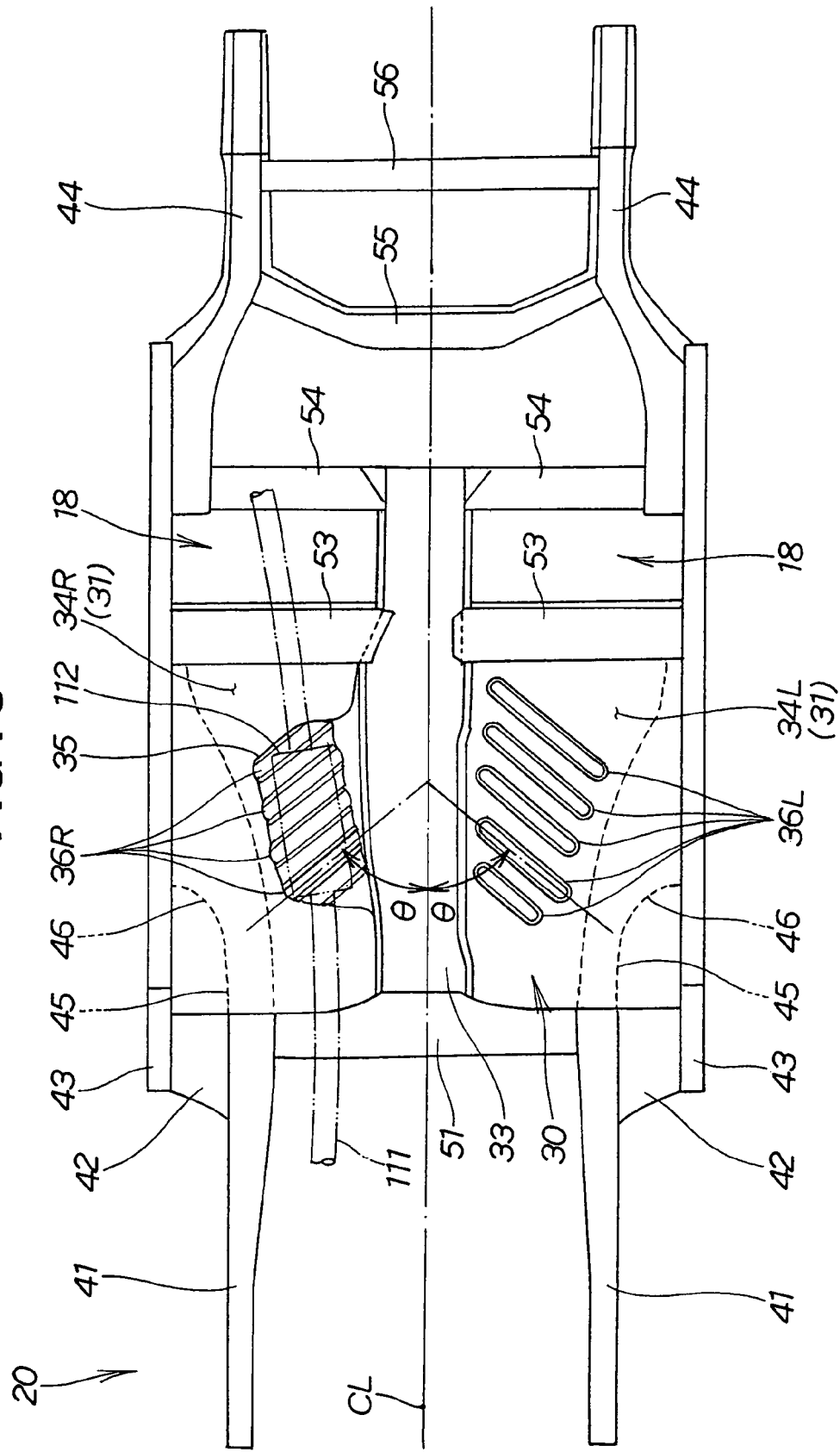
FIG. 8 is a plan view of the body mounted with the floor panel having the beads.
Figure 9:
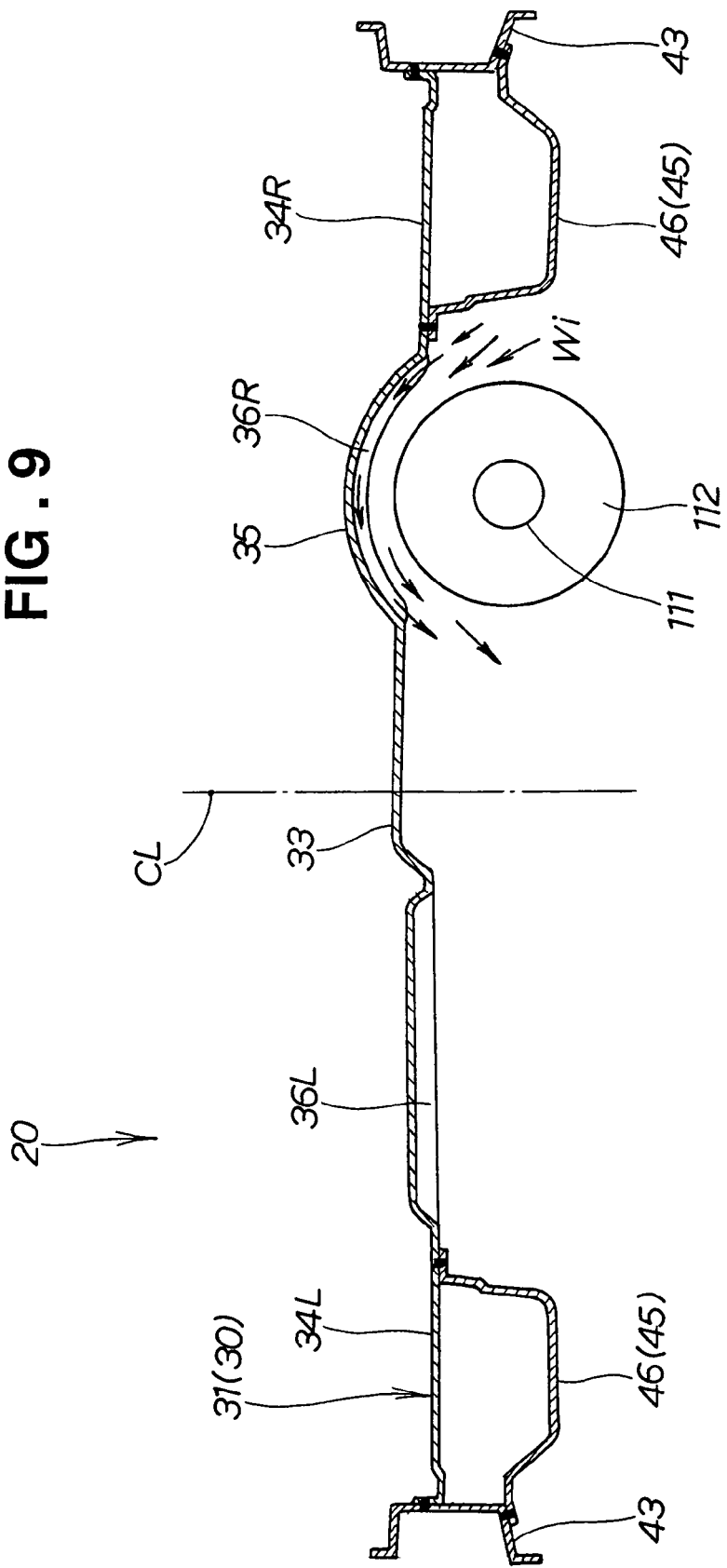
FIG. 9 is a cross-sectional view of the floor panel having the beads.
Figure 10:
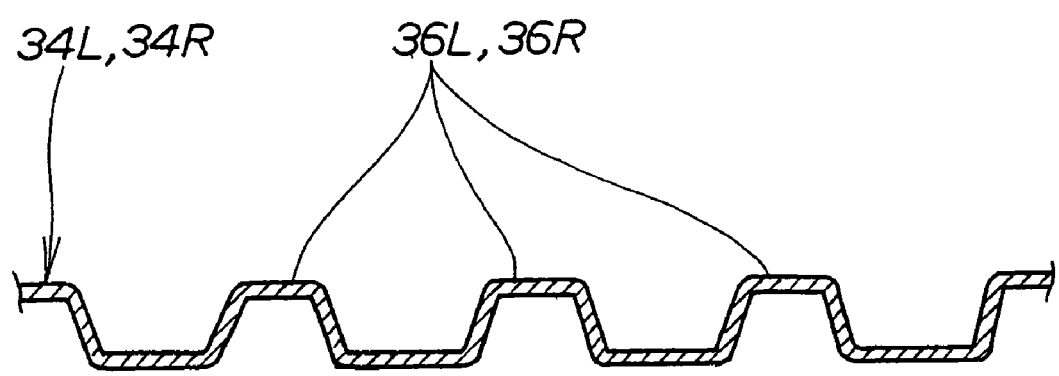
FIG. 10 is a cross-sectional view of a beaded portion of the floor panel shown in FIG. 8.

Now, the structure for increasing the rigidity of the floor panel 30 will be described with reference to FIGS. 2 and 8 to 10. FIG. 8 is a plan view of the vehicle body provided with the floor panel, corresponding to FIG. 3. FIG. 9 is a cross-sectional view of the vehicle body provided with the floor panel, when viewed from the rear. FIG. 10 shows beads formed in the floor panel.

As described above, the vehicle body 20 in this embodiment has a structure in which the floor panel 30 continuous with the floor tunnel 33 is placed over and joined to the left and right floor frame members 45, 45. The right floor half 34R of the front floor panel 31 has the bulging portion 35 formed in the vicinity of the floor tunnel 33, bulging upward to let a longitudinally extending engine exhaust pipe 111 and muffler 112 run under the floor. As shown in FIG. 9, the bulging portion 35 has an arc shape in a cross-sectional view.

The front floor panel 31 of the floor panel 30 has the beads 36L, 36R formed, in a plan view, from at least one side of the left and right floor frame members 45, 45 to the transversal center CL, extending obliquely rearward. The beads 36L, 36R are aligned longitudinally of the body 20 at almost regular intervals.

More specifically, the left beads 36L formed in the flat left floor half 34L are elongate ridges extending obliquely rearward from a front portion of the left floor frame member 45 toward the transversal center CL.

The right beads 36R formed in the right floor half 34R are elongate ridges extending obliquely rearward from a front portion of the right floor frame member 45 toward the transversal center CL. The right beads 36R are mainly formed on the bulging portion 35.

When viewed from the top, the beads 36L, 36R are inclined with respect to the transversal center CL at an inclination angle $\theta$. The inclination angle $\theta$ is preferably 40° to 50°.

As described above, the engine exhaust pipe 111 and muffler 112 are disposed under the floor, protruded downward from the floor panel 30. The beads 36R extend above the engine exhaust pipe 111 and muffler 112. Thus, a space is formed between the engine exhaust pipe 111 and muffler 112 and the floor panel 30 by the formation of the beads 36R.

When the vehicle 10 is running, part of running wind Wi going under the floor passes through the beads 36L, 36R, flowing obliquely rearward from the left and right front portions toward the transversal center CL. As a result, the engine exhaust pipe 111 and muffler 112 can be cooled also along the space under the floor panel 30 by the running wind Wi, resulting in improved performance of cooling the engine exhaust pipe 111 and muffler 112.

Since part of the running wind Wi going under the floor can be passed through the beads 36R, the running vehicle can have improved aerodynamics, even though the engine exhaust pipe 111 and muffler 112 are protruded downward from the floor panel 30.

The beads 36L, 36R may be configured (1) to extend obliquely rearward from the vicinities of the floor frame members 45, 45 toward the transversal center Cl, or (2) to intersect (overlap with, in a plan view) the floor frame members 45, 45 at one end, extending obliquely rearward toward the transversal center CL at the other end.

Figure 11A:
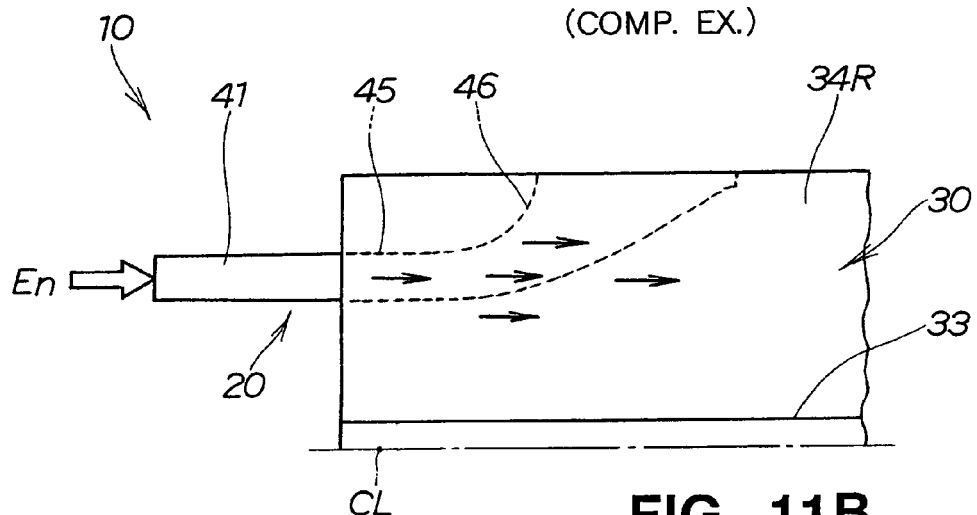
FIGS. 11A, 11B and 11C are diagrams illustrating a comparative example in which an impact energy acts on a floor panel having no beads and a state in which an impact energy acts on the present embodiment having the beads.
Figure 11B:
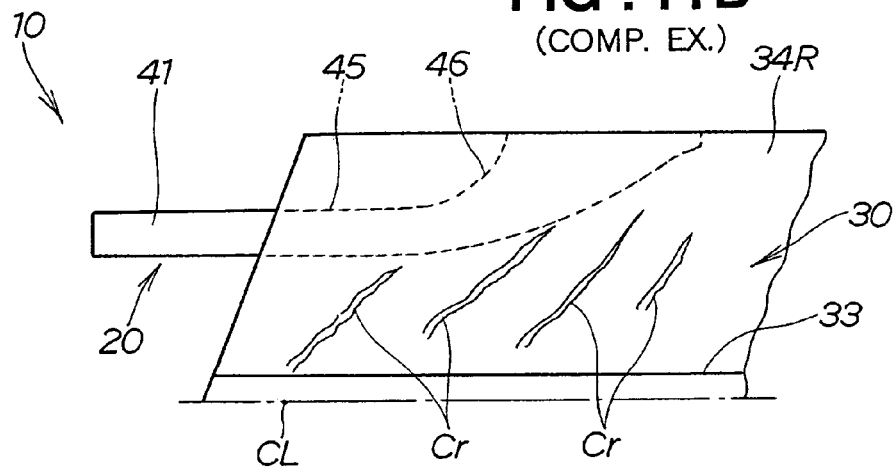
Figure 11C:
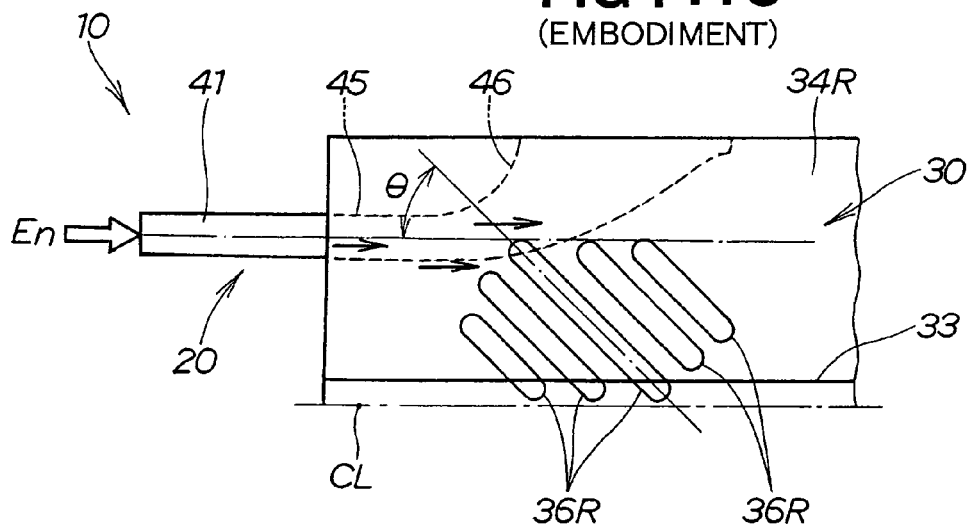
Figure 12:
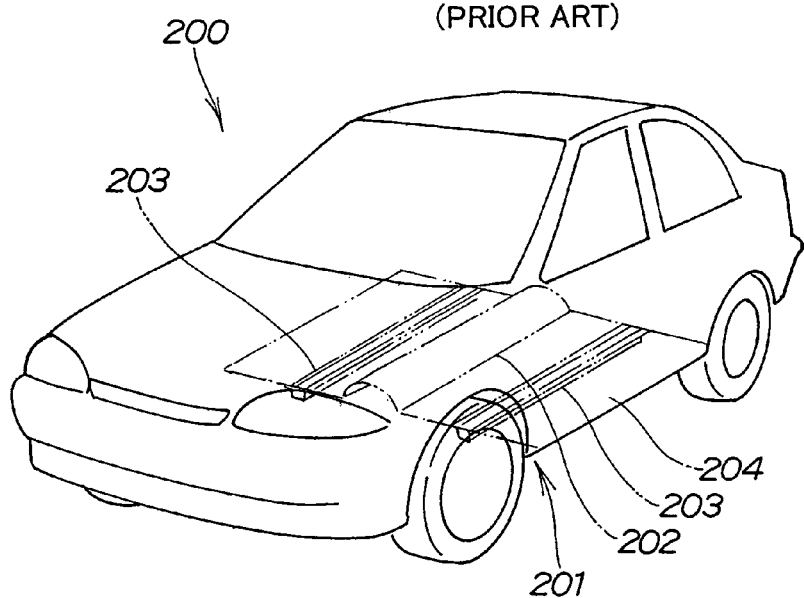
FIG. 12 is a schematic perspective view of a vehicle having a conventional body structure.
Figure 13:
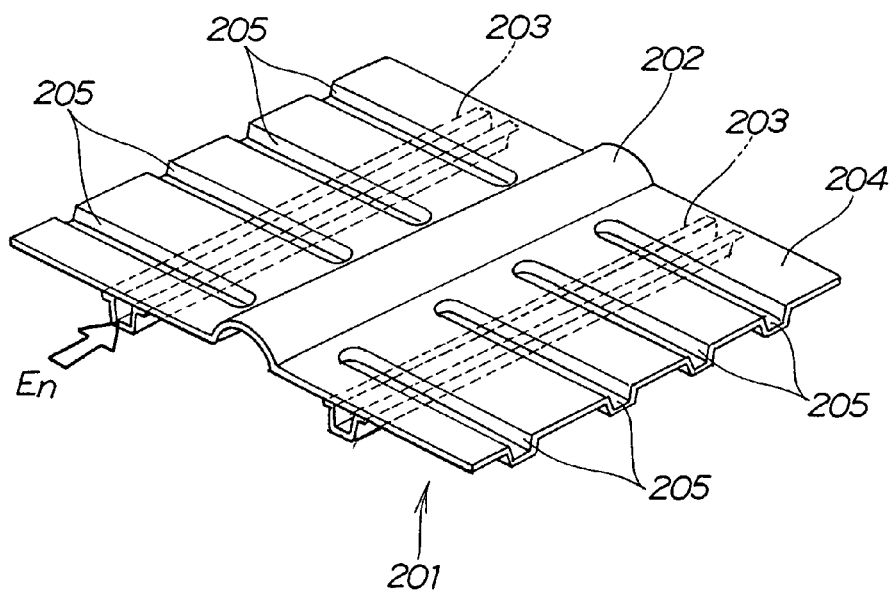
FIG. 13 is a perspective view of a floor panel with beads shown in FIG. 12.

FIGS. 11A and 11B illustrate a comparative example of a floor panel and surrounding parts, and FIG. 11C illustrates this embodiment.

FIG. 11A illustrates a floor panel 30 in the comparative example without any reinforcement. When an impact energy En acts from the front on a front transversely outer position of a vehicle 10, that is, at an offset impact on the front of a body 20, the impact energy En acts on the front end of a floor frame members 45 via a front side frame member 41. The impact energy En is dispersed and transmitted from the floor frame member 45 into the corresponding one of the left and right sides of the floor panel 30 (a right floor half 34R), and also transmitted to a floor tunnel 33.

At a frontal crash, an impact energy En is received by the pair of left and right floor frame members 45, only ½ of which acting on each floor frame member 45. By contrast, an impact energy En at an offset collision is greater on one of the right and left sides. Compared with that at a frontal crash, the impact energy En acting on one of the floor frame members 45 is significantly greater. The impact energy En transmitted from the floor frame member 45 to the floor panel 30 is also greater.

When the great impact energy En causes the floor frame member 45 to retreat as shown in FIG. 11B, the floor panel 30 deforms rearward from the floor tunnel 33 having relatively high rigidity.

Specifically, since having relatively small rigidity, the floor panel 30 can be plastically deformed to a large extent. For example, a plurality of large creases Cr can be formed in the floor panel 30. The floor panel 30 receives the impact energy En from the floor frame member 45 in a position laterally offset from the transversal center CL. Thus, the floor panel 30 is deformed rearward from the floor tunnel 33. As a result, the flat floor panel 30 receives an obliquely rearward compression load from the floor frame member 45 toward the transversal center. Creases Cr are produced, extending obliquely rearward to the side from the floor tunnel 33.

The production of the creases Cr affects the amount of retreat of the floor frame member 45 joined to the floor panel 30, and also affects the state of the joint between the floor panel 30 and the floor frame member 45.

In contrast, the floor panel 30 in this embodiment shown in FIG. 11C is formed with the beads 36R extending, in top plan view, obliquely rearward from the floor frame member 45. to the transversal center CL and aligned longitudinally of the vehicle body (from left to right in the Figure). That is, since the floor panel 30 will receive an obliquely rearward compressive load from the floor frame member 45 toward the transversal center Cl, the elongate beads 36 are provided generally in the direction of the load. In other words, the beads 36R are provided in the direction substantially orthogonal to the direction of formation of the creases Cr shown in FIG. 11B.

As a result, the beads 36R increase the rigidity of the floor panel 30 in the direction of a compressive load. In this manner, the rigidity of the floor panel 30 against an impact energy En at an offset collision is increased. The increased rigidity of the floor panel 30 prevents production of creases, limiting the retreat of the floor frame member 45 due to an impact energy En. The prevention of deformation of the floor panel 30 results in a limited amount of retreat of the floor frame member 45 joined to the floor panel 30, maintaining the state of the joint between the floor panel 30 and the floor frame member 45.

The structure of only forming the beads 36 obliquely in the floor panel 30, increasing the rigidity of the floor panel 30 simplifies the structure of the vehicle body 20, preventing an increased weight of the body 20.

The formation of the beads 36R increases the rigidity of the floor panel 30, especially thicknesswise rigidity (often called surface rigidity), improving the damping performance (a property of limiting vibration) of the floor panel 30 when the vehicle is running.

In this invention, the beads 36L, 36R are not limited to the shape, size and number shown in the embodiment, and may be desirably changed.

The left and right floor frame members 45, 45 are not limited to the configuration in which the rear end portions 46, 46 are bent toward and joined to the longitudinally middle portions of the left and right side sills 43, 43, and may alternatively be extended straightly rearward of the body 20.

The configuration of joining the rear end portions 46 of the floor frame members 45 to the longitudinally middle portions of the side sills 43 may be a direct and/or indirect joint. For example, one of the following configurations (1) to (3) may be used:

(1) the configuration in which the rear end portions 46, 46 of the left and right floor frame members 45, 45 are directly joined only to longitudinally middle portions of the left and right side sills 43, 43;

(2) the configuration in which the rear end portions 46, 46 of the left and right floor frame members 45, 45 are joined only to the third crossmembers 53, 53, and the third crossmembers 53, 53 are joined to longitudinally middle portions of the left and right side sills 43, 43, whereby the rear end portions 46, 46 of the left and right floor frame members 45, 45 are indirectly joined to the longitudinally middle portions of the left and right side sills 43, 43 via the third crossmembers 53, 53. The left and right third crossmembers 53, 53 may alternatively be integrated into one piece; and (3) the configuration using the (1) and (2) in combination.

As described above, the body structure in this invention is suitable for vehicles in which a floor tunnel 33 is extended longitudinally at the transversal center, and floor frame members 45, 45 are longitudinally extended on the opposite sides of the floor tunnel 33.

Obviously, various minor changes and modifications of the present invention are possible in the light of the above teaching. It is therefore to be understood that within the scope of the appended claims the invention may be practiced otherwise than as specifically described.

What is claimed is:

1. A vehicle body structure comprising:
   a floor panel having a floor tunnel formed at a transversal center and extending longitudinally of a vehicle body;
   left and right floor frame members provided on opposite sides of the floor tunnel in spaced relation to each other and extending longitudinally of the vehicle body;
   left and right front side frame members extending toward a front part of the vehicle body from front ends of the left and right floor frame members, respectively; and,
   left and right side sills disposed outside the floor frame members and extending toward a rear part of the vehicle body from rear ends of the front frame members,
   the floor panel being placed on and joined to the left and right floor frame members and having a plurality of beads extending substantially parallel, in top plan view, and obliquely rearward from each of the left and right floor frame members toward the floor tunnel, the rear ends of the floor frame members being curved toward and joined to the respective side sills.

2. The vehicle body structure according to claim 1, wherein the rear ends of the left and right floor frame members are joined to crossmembers that are connected between the side sills.

3. The vehicle body structure according to claim 1, wherein each of the left and right floor frame members is provided with a seat bracket to which a passenger seat may be secured.

4. The vehicle body structure according to claim 3, wherein the left and right floor frame members, the floor panel, and the seat brackets are fixedly fastened together by means of plural nuts, provided on the floor frame members or on stays provided on the floor frame members, and plural bolts.

* * * * *